United States Patent
Adachi

(10) Patent No.: US 9,849,760 B2
(45) Date of Patent: Dec. 26, 2017

(54) RESIN BACK DOOR FOR VEHICLE

(71) Applicant: TOYOTA JIDOSHA KABUSHIKI KAISHA, Toyota-shi, Aichi-ken (JP)

(72) Inventor: Yoshiyuki Adachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/941,162

(22) Filed: Nov. 13, 2015

(65) Prior Publication Data
US 2016/0167493 A1 Jun. 16, 2016

(30) Foreign Application Priority Data

Dec. 15, 2014 (JP) .................................. 2014-252923

(51) Int. Cl.
*B60J 5/10* (2006.01)
(52) U.S. Cl.
CPC ..................................... *B60J 5/107* (2013.01)
(58) Field of Classification Search
CPC ... B60J 5/107; B60J 5/10; B60J 5/102; B62D 65/06
See application file for complete search history.

(56) References Cited

U.S. PATENT DOCUMENTS

| 4,822,098 A * | 4/1989 | Vogt | B60J 5/101 |
| | | | 296/146.5 |
| 4,880,267 A * | 11/1989 | Ohya | B60J 5/107 |
| | | | 296/146.8 |
| 2010/0102589 A1 | 4/2010 | Miyake et al. | |
| 2014/0203591 A1* | 7/2014 | Lathwesen | B60J 5/107 |
| | | | 296/146.8 |
| 2016/0075216 A1* | 3/2016 | Kamimura | B60J 1/006 |
| | | | 296/146.2 |

FOREIGN PATENT DOCUMENTS

| DE | 199 37 333 | * 3/2001 |
| DE | 10 2011 000 063 | * 7/2012 |
| EP | 2 179 877 | * 4/2010 |
| FR | 2 675107 | * 10/1992 |
| JP | S62-126538 | 8/1987 |

(Continued)

OTHER PUBLICATIONS

Dec. 20, 2016 Office Action issued in Japanese Patent Application No. 2014-252923.

*Primary Examiner* — Gregory Strimbu
(74) *Attorney, Agent, or Firm* — Oliff PLC

(57) ABSTRACT

A vehicle has a resin back door including a skeleton portion that is closed in cross-section and a glass plate supported by the skeleton portion. A skeleton side portion includes an inner wall portion defining an innermost peripheral surface of the skeleton portion, an outer wall portion disposed between the inner wall portion and the glass plate, and an intermediate wall portion with one end connected to a vehicle outer side end portion of the inner wall portion and another end connected to a vehicle transverse direction inner side end portion of the outer wall portion. The intermediate wall portion is curved to have a convex shape at an intermediate location thereof, and the convex shape protrudes toward an exterior of the closed cross-sectional skeleton portion.

5 Claims, 3 Drawing Sheets

(56) References Cited

FOREIGN PATENT DOCUMENTS

| | | | |
|---|---|---|---|
| JP | H07-257189 A | | 10/1995 |
| JP | 2010-100163 A | | 5/2010 |
| JP | 2010-195117 A | | 9/2010 |
| JP | 2014-131896 A | | 7/2014 |
| WO | WO 2015/076269 | * | 5/2015 |

* cited by examiner

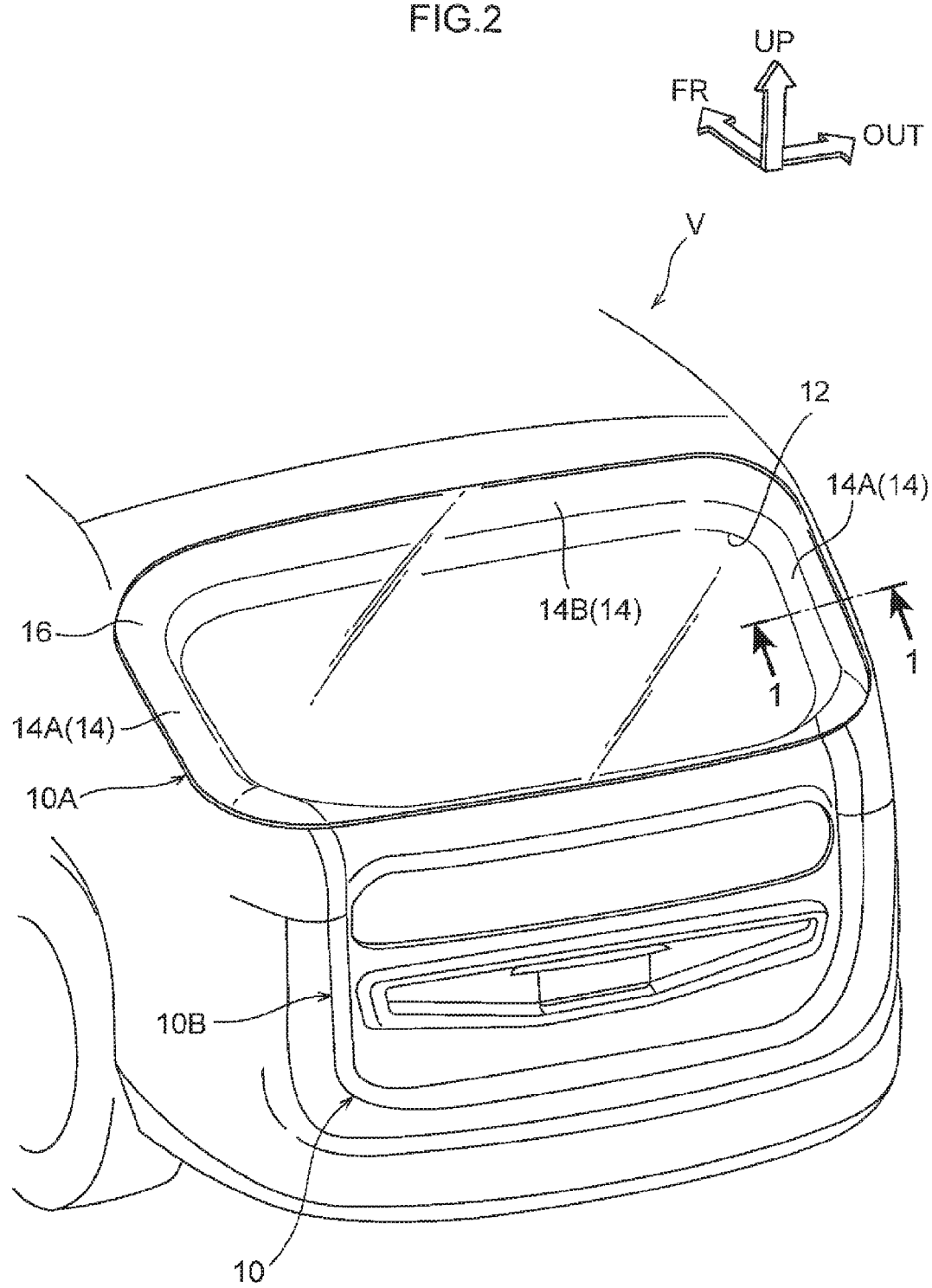

RESIN BACK DOOR FOR VEHICLE

CROSS-REFERENCE TO RELATED APPLICATION

This application claims priority under 35 USC 119 from Japanese Patent Application No. 2014-252923 filed Dec. 15, 2014, the disclosure of which is incorporated by reference herein.

BACKGROUND

Technical Field

The present invention relates to a resin back door for a vehicle.

Related Art

Japanese Patent Application Laid-Open (JP-A) No. 2014-131896 discloses a resin back door for a vehicle in which an inner panel and an outer panel, that are respectively made of resin, are joined by an adhesive. In the aspect illustrated in FIG. 4 of JP-A No. 2014-131896, the outer panel is disposed at the vehicle outer side of the inner panel, and a skeleton portion that forms a closed cross-sectional structure is formed by the inner panel and the outer panel. At this skeleton portion, a bent portion of the outer panel is joined by an adhesive to an inner wall portion of the inner panel. Further, an inclined wall, that is bent toward the vehicle transverse direction outer side and the vehicle upper side from the upper end portion of the bent portion, is formed at the outer panel. The distal end portion of the inclined wall extends rectilinearly to the near side of a back window glass. Due thereto, the field of vision toward the rear of the vehicle at the resin back door for a vehicle can be widened as compared with a case in which the inner wall portion of the inner panel is extended to the near side of the back window glass.

However, at the above-described resin back door for a vehicle, the skeleton portion is formed in a closed cross-sectional shape in order to ensure the torsional rigidity of the skeleton portion, but there is still room for improvement with regard to the point of making the skeleton portion be a cross-sectional shape that is efficient with respect to torsional rigidity.

SUMMARY

In view of the above-described circumstances, the present invention provides a resin back door for a vehicle that improves the visibility toward the rear of the vehicle, while making a skeleton portion be a cross-sectional shape that is efficient with respect to torsional rigidity.

A resin back door for a vehicle of a first aspect of the present invention includes: a skeleton portion that structures a frame portion of an opening portion for viewing toward a rear of a vehicle, and that is formed as a closed cross-sectional structure having a closed cross-sectional portion at an interior thereof due to an inner panel and an outer panel that are made of resin being joined together; and a glass plate that is supported at the skeleton portion and closes the opening portion from a vehicle outer side, wherein skeleton side portions that structure vehicle transverse direction side portions at the skeleton portion are each structured to include: an inner wall portion that is disposed such that a plate thickness direction thereof extends in a vehicle transverse direction, and that structures an inner peripheral surface of the opening portion; an outer wall portion that is disposed at a vehicle transverse direction outer side of the inner wall portion and that faces the glass plate; and an intermediate wall portion that is bent toward a vehicle transverse direction outer side and a vehicle outer side from a vehicle outer side end portion of the inner wall portion, and that is joined to a vehicle transverse direction inner side end portion of the outer wall portion, the intermediate wall portion being curved in a cross-section cut in the vehicle transverse direction, such that a vehicle transverse direction intermediate portion is convex toward an exterior of the closed cross-sectional portion.

In the first aspect, the frame portion of the opening portion for viewing toward the rear of the vehicle is structured by the skeleton portion. This skeleton portion is formed by the inner panel and the outer panel that are made of resin being joined to one another, and is formed as a closed cross-sectional structure having a closed cross-sectional portion at the interior thereof. Moreover, the glass plate is supported at the skeleton portion so as to close the opening portion from the vehicle outer side.

Further, each of the skeleton side portions, that structure vehicle transverse direction side portions at the skeleton portion, has an inner wall portion that structures the inner peripheral surface of the opening portion, and an outer wall portion that is disposed at the vehicle transverse direction outer side of the inner wall portion so as to face the glass plate. Further, the intermediate wall portion of the skeleton side portion, that is bent toward the vehicle transverse direction outer side and the vehicle outer side from the vehicle outer side end portion of the inner wall portion, is joined to the vehicle transverse direction inner side end portion of the outer wall portion. Due thereto, at the skeleton portion, the field of vision toward the rear of the vehicle at the opening portion can be widened as compared with a case in which the intermediate wall portion were to be omitted.

Here, in a cross-section in which the skeleton side portion is cut in the vehicle transverse direction, the intermediate wall portion is curved such that the vehicle transverse direction intermediate portion of the intermediate wall portion is convex toward the exterior of the closed cross-sectional portion. Therefore, the shape of the skeleton portion can be formed to be close to circular, as compared with a case in which the intermediate wall portion were to be extended rectilinearly. Due thereto, the skeleton portion can be made to be a cross-sectional shape that is efficient with respect to torsional rigidity.

Further, because the intermediate wall portion is curved such that the vehicle transverse direction intermediate portion of the intermediate wall portion is convex toward the exterior of the closed cross-sectional portion, the angle of inclination of the vehicle transverse direction outer side portion of the intermediate wall portion with respect to the vehicle transverse direction can be made to be small, in a cross-section in which the skeleton side portion is cut in the vehicle transverse direction. Therefore, the vehicle transverse direction inner side end portion of the outer wall portion is disposed at the vehicle transverse direction outer side, as compared with a case in which the intermediate wall portion extends rectilinearly. Thus, the field of vision toward the rear of the vehicle at the opening portion can be widened more. Due to the above, the visibility toward the rear of the vehicle can be improved while the skeleton portion is made to be a cross-sectional shape that is efficient with respect to torsional rigidity.

In a resin back door for a vehicle of a second aspect of the present invention, in the first aspect, in a cross-section in which the skeleton side portion is cut in the vehicle transverse direction, the vehicle transverse direction intermediate portion of the intermediate wall portion is formed in a circular arc shape whose center is a torsional center of the skeleton side portion.

In the second aspect, the vehicle transverse direction intermediate portion of the intermediate wall portion is formed in a circular arc shape whose center is the torsional center of the skeleton side portion. Thus, the skeleton portion can be made to be a cross-sectional shape that is more efficient with respect to torsional rigidity.

In a resin back door for a vehicle of a third aspect of the present invention, in the first aspect, in a cross-section in which the skeleton side portion is cut in the vehicle transverse direction, the intermediate wall portion is formed in a shape of a polygon having plural vertices.

In the third aspect, because the intermediate wall portion is formed in the shape of a polygon having plural vertices, the shape of the skeleton portion can be formed so as to be closer to circular. Due thereto, the skeleton portion can be made to be a cross-sectional shape that is more efficient with respect to torsional rigidity.

In a resin back door for a vehicle of a fourth aspect of the present invention, in any one of the first through third aspects, the inner wall portion is structured to include a joined portion of the inner panel and the outer panel.

In the fourth aspect, the inner wall portion is structured to include the joined portion of the inner panel and the outer panel. In other words, the joined portion of the inner panel and the outer panel is structured as a wall portion that demarcates the interior and the exterior of the closed cross-sectional portion. Due thereto, because the joined portion of the inner panel and the outer panel is not made to extend-out from the skeleton side portion to the exterior of the closed cross-sectional portion, the inner panel and the outer panel can be joined at the aforementioned joined portion without impeding the visibility toward the rear of the vehicle at the resin back door for a vehicle.

In a resin back door for a vehicle of a fifth aspect of the present invention, in the fourth aspect, a vehicle transverse direction inner side end portion of the intermediate wall portion is disposed adjacent to the joined portion.

In the fifth aspect, because the vehicle transverse direction inner side end portion of the intermediate wall portion is disposed adjacent to the joined portion, the length of the inner wall portion that connects the joined portion at the inner wall portion and the intermediate wall portion becoming long can be suppressed. Due thereto, the surface area of the closed cross-sectional portion becoming greater than needed can be suppressed. Accordingly, the visibility toward the rear of the vehicle at the resin back door for a vehicle can be improved in this respect as well.

BRIEF DESCRIPTION OF THE DRAWINGS

Exemplary embodiments of the present invention will be described in detail based on the following figures, wherein:

FIG. 2 is a perspective view that is seen from a vehicle rear side and schematically shows the entire resin back door for a vehicle that is shown in FIG. 1;

DETAILED DESCRIPTION

Figure 1:
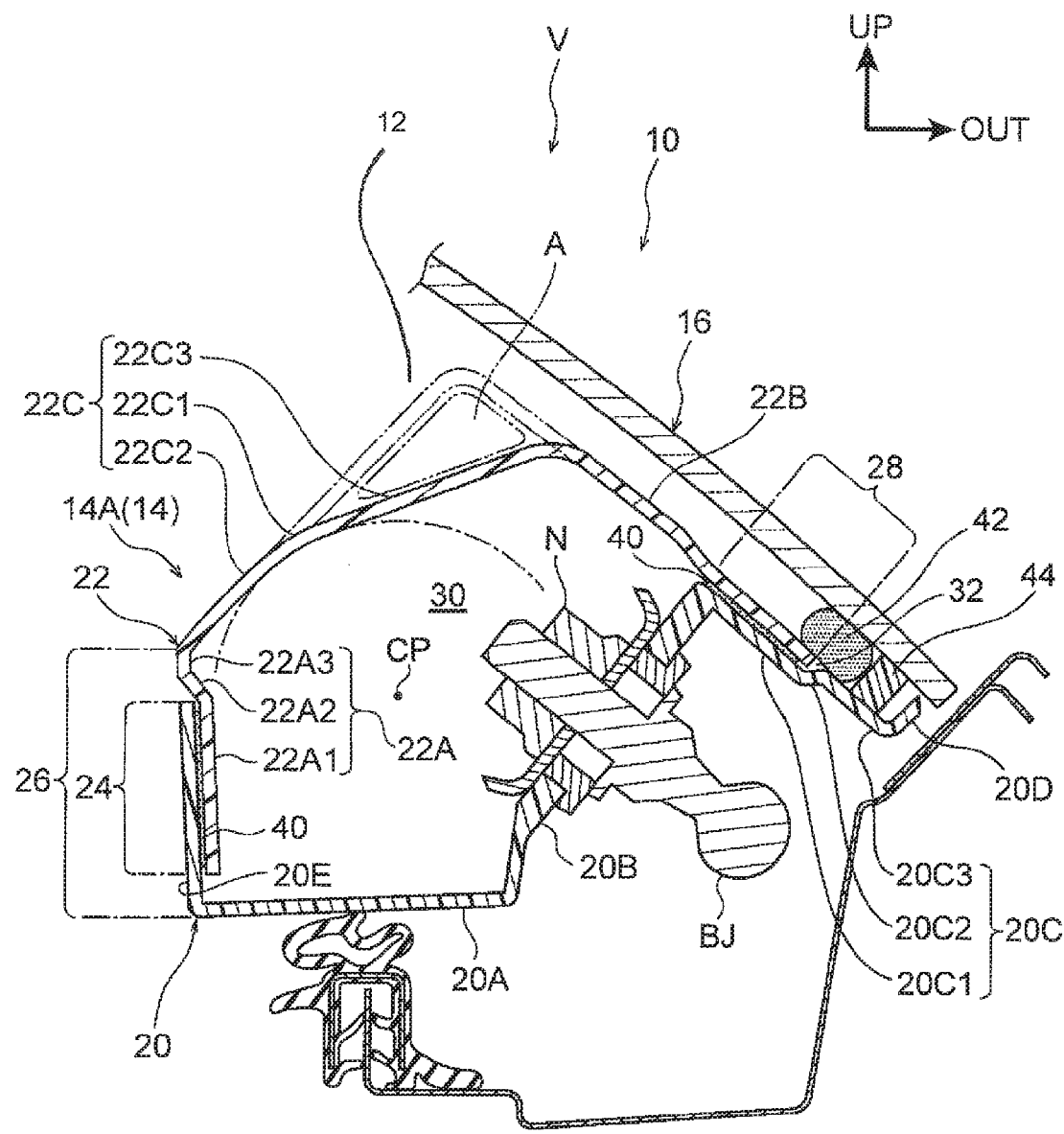
FIG. 1 is a cross-sectional view in which a skeleton side portion of a resin back door for a vehicle relating to a present embodiment is cut in a vehicle transverse direction (an enlarged sectional view at line 1-1 of FIG. 2)

A resin back door 10 for a vehicle (hereinafter simply called back door 10) that relates to the present embodiment is described hereinafter by using the drawings. Note that arrow FR that is shown appropriately in the respective drawings indicates the vehicle front side of a vehicle (an automobile) V to which the back door 10 is applied, and arrow UP indicates the vehicle upper side. Moreover, arrow OUT indicates the vehicle transverse direction outer side.

The back door 10 is shown in FIG. 2 in a perspective view seen obliquely from the left and the rear side. As shown in this drawing, the back door 10 is provided at the rear end portion of the vehicle V. The upper end portion of the back door 10 is joined by hinges to a vehicle body and is rotatable around the axial direction of the hinges which is the vehicle transverse direction, and the back door 10 is supported at the vehicle body so as to be able to be opened and closed.

The back door 10 is formed in a substantial L-shape as seen in a vehicle side view. Concretely, the back door 10 is structured by a door upper portion 10A that extends gently from the upper end portion of the back door 10 toward the rear of the vehicle, and a door lower portion 10B that hangs-down toward the vehicle lower side from the rear end portion of the door upper portion 10A. The door upper portion 10A is described in detail hereinafter.

An opening portion 12, that is for viewing toward the rear of the vehicle and that is formed in a substantially rectangular shape, is formed at the door upper portion 10A. A skeleton portion 14 that structures the frame portion of the opening portion 12 is provided at the periphery of the opening portion 12. Further, a rear window glass 16, that serves as a "glass plate" that closes the opening portion 12 from the vehicle outer side, is provided at the door upper portion 10A. The rear window glass 16 is formed substantially in the shape of a rectangular flat plate that gently curves toward the vehicle outer side, and is supported at the skeleton portion 14. Further, the vehicle transverse direction side portions of the skeleton portion 14 are made to be skeleton side portions 14A respectively, and the upper end portion of the skeleton portion 14 is made to be a skeleton upper portion 14B. Hereinafter, the skeleton portion 14 is described mainly by using the skeleton side portion 14A.

FIG. 1 is a cross-sectional view in which the skeleton side portion 14A is cut in the vehicle transverse direction. The skeleton side portion 14A (the skeleton portion 14) is structured by a door inner panel 20 that serves as an "inner panel" and is disposed at the vehicle inner side, and a door outer panel 22 that serves as an "outer panel" and is disposed at the vehicle outer side. Both the door inner panel 20 and the door outer panel 22 are made of resin. Concretely, the door inner panel 20 and the door outer panel 22 are structured by a CFRP (carbon-fiber-reinforced plastic: carbon-fiber-reinforced resin).

Note that, as shown in FIG. 2, the door inner panel 20 is structured as a panel member that is relatively large, so as to form the entire skeleton of the back door 10. The aforementioned opening portion 12 is formed in the door inner panel 20. Further, the door outer panel 22 is disposed at the periphery of the opening portion 12. Concretely, the door outer panel 22 is disposed at the vehicle transverse direction sides with respect to the opening portion 12, and at the vehicle upper side with respect to the opening portion 12.

Further, as described above, the skeleton portion 14 is structured by the door outer panel 22 and the door inner panel 20. Therefore, the back door 10 is structured such that the rigidity of the back door 10 is ensured mainly by the door inner panel 20. Further, the lower portion of the door inner panel 20 is covered from the vehicle outer side by an unillustrated lower outer panel or the like.

Returning to FIG. 1, the door inner panel 20 is formed in a substantial U-shape that opens toward the vehicle upper side, in a cross-section cut in the vehicle transverse direction. Concretely, the door inner panel 20 has an inner side lower wall portion 20A that is disposed such that the plate thickness direction thereof extends in the vehicle vertical direction, an inner side inclined portion 20B that extends-out obliquely toward the upper side and the vehicle transverse direction outer side from the vehicle transverse direction outer side end portion of the inner side lower wall portion 20A, and an inner side flange portion 20C that extends-out toward the vehicle transverse direction outer side, parallel to the rear window glass 16, from the vehicle transverse direction outer side end portion of the inner side inclined portion 20B. Further, the vehicle transverse direction outer side end portion of the inner side flange portion 20C is bent substantially perpendicularly toward the rear window glass 16 side, and is made to be an outer end portion 20D. Further, the door inner panel 20 has an inner side inner wall portion 20E that extends-out toward the vehicle upper side from the vehicle transverse direction inner side end portion of the inner side lower wall portion 20A. Note that a ball joint BJ of an unillustrated damper stay, at whose distal end portion a male screw is formed, is fastened (fixed) to the inner side inclined portion 20B by a nut N. Therefore, the plate thickness of the inner side inclined portion 20B is formed to be thicker than that of other regions.

Further, the inner side flange portion 20C is structured by an inner side joined portion 20C1 that structures the portion at the proximal end side of the inner side flange portion 20C, a step portion 20C2 that is bent substantially in the shape of a crank from the vehicle transverse direction outer side end portion of the inner side joined portion 20C1 toward the vehicle outer side (the rear window glass 16 side), and an extending portion 20C3 that extends from the step portion 20C2 toward the vehicle transverse direction outer side parallel to the inner side joined portion 20C1.

On the other hand, the door outer panel 22 forms a closed cross-sectional shape that opens toward the vehicle lower side, in a cross-section cut in the vehicle transverse direction. Concretely, the door outer panel 22 is structured to include an outer side inner wall portion 22A that structures the vehicle transverse direction inner side end portion of the door outer panel 22, an outer side outer wall portion 22B that serves as an "outer wall portion" and structures the vehicle transverse direction outer side portion of the door outer panel 22, and an outer side connecting wall portion 22C that serves as an "intermediate wall portion" that connects the outer side inner wall portion 22A and the outer side outer wall portion 22B. The respective wall portions of the door outer panel 22 are described hereinafter.

The outer side inner wall portion 22A is disposed such that the plate thickness direction thereof extends in the vehicle transverse direction. Further, the outer side inner wall portion 22A is structured to include an outer side joined portion 22A1 that is adjacent to the vehicle transverse direction inner side of the inner side inner wall portion 20E, a step portion 22A2 that is bent substantially in the shape of a crank from the upper end portion of the outer side joined portion 22A1 toward the inner side inner wall portion 20E side, and an extending portion 22A3 that extends from the step portion 22A2 toward the vehicle upper side and parallel to the outer side joined portion 22A1. Further, an adhesive 40 for structuring is interposed between the inner side inner wall portion 20E and the outer side joined portion 22A1, and the outer side joined portion 22A1 is joined to the inner side inner wall portion 20E. Further, the joined portion (overlapping portion) of the inner side inner wall portion 20E and the outer side inner wall portion 22A is made to be a first joined portion 24 that serves as a "joined portion". Note that, for example, a two-liquid urethane adhesive having high strength and low extension can be used as the adhesive 40 for structuring.

Further, the height of the step portion 22A2 is set to be substantially the same as the dimension obtained by adding the post-hardening thickness of the adhesive 40 for structuring to the plate thickness of the inner side inner wall portion 20E. Therefore, in the state in which the outer side joined portion 22A1 is joined to the inner side inner wall portion 20E, the vehicle transverse direction inner side surfaces of the extending portion 22A3 and the inner side inner wall portion 20E are positioned in the same plane (are flush with one another). Moreover, the entirety of the inner side inner wall portion 20E and the outer side inner wall portion 22A that are joined at the first joined portion 24 is made to be an inner wall portion 26 that structures the vehicle transverse direction inner side portion of the skeleton portion 14. Namely, the inner wall portion 26 is structured so as to include the first joined portion 24, and structures the inner peripheral surface of the opening portion 12. Still further, the length of the extending portion 22A3 in the vehicle vertical direction is set to be relatively short (e.g., to the minimum dimension at which the extending portion 22A3 can be molded). Due thereto, the outer side connecting wall portion 22C, that will be described later, is disposed adjacent to the upper end portion of the first joined portion 24.

At the vehicle transverse direction outer side of the inner wall portion 26, the outer side outer wall portion 22B is disposed parallel to the rear window glass 16. Further, the vehicle transverse direction inner side end portion of the outer side outer wall portion 22B is disposed further toward the vehicle upper side than the upper end portion of the inner wall portion 26 (the extending portion 22A3 of the outer side inner wall portion 22A). Moreover, the vehicle transverse direction outer side portion of the outer side outer wall portion 22B is adjacent to the rear window glass 16 side of the inner side joined portion 20C1 of the inner side flange portion 20C, and the adhesive 40 for structuring is interposed between the both. Due thereto, the outer side outer wall portion 22B is joined to the inner side joined portion 20C1, and this joined portion is made to be a second joined portion 28. Due thereto, the skeleton portion 14 is formed as a closed cross-sectional structure that has a closed cross-sectional portion 30 at the interior thereof. Further, the inner wall portion 26 is structured as a wall portion that is disposed between the interior and the exterior of the closed cross-sectional portion 30. Further, the second joined portion 28 extends toward the exterior of the closed cross-sectional portion 30 with respect to the closed cross-sectional portion 30.

Note that the height of the step portion 20C2 of the inner side flange portion 20C is set to be substantially the same as the dimension obtained by adding the post-hardening thickness of the adhesive 40 for structuring to the plate thickness of the outer side outer wall portion 22B. Therefore, in the state in which the outer side outer wall portion 22B is joined to the inner side joined portion 20C1, the respective surfaces at the rear window glass 16 side of the extending portion 20C3 of the inner side flange portion 20C and the outer side outer wall portion 22B are positioned in the same plane (are flush with one another).

Further, in the state in which the outer side outer wall portion 22B is joined to the inner side flange portion 20C, a gap 32 is formed at the juncture between the inner side flange portion 20C and the outer side outer wall portion 22B. Concretely, the gap 32 is positioned between the distal end portion of the outer side outer wall portion 22B and the step portion 20C2 of the inner side flange portion 20C. Further, an adhesive 42 for a peripheral part is disposed so as to close the gap 32. The three parts that are the extending portion 20C3 of the inner side flange portion 20C, and the outer side outer wall portion 22B, and the rear window glass 16 are joined to one another by this adhesive 42 for a peripheral part. Due thereto, the rear window glass 16 is joined to the skeleton portion 14 and is supported by the skeleton portion 14. Note that, for example, a one-liquid urethane adhesive can be used as the adhesive 42 for a peripheral part.

Moreover, a dam member 44 that is a water-stopping member is disposed at the extending portion 20C3 at the vehicle transverse direction outer side of (adjacent to) the adhesive 42 for a peripheral part. Due thereto, the region between the extending portion 20C3 and the rear window glass 16 is sealed by the dam member 44. Further, black paint is applied to the vehicle inner side surface of the rear window glass 16, at the portion that faces the outer side outer wall portion 22B and the inner side flange portion 20C. Due thereto, there is a structure in which, in the state in which the rear window glass 16 is joined to the skeleton portion 14, the outer side outer wall portion 22B and the second joined portion 28 cannot be seen from the vehicle outer side due to the rear window glass 16.

The outer side connecting wall portion 22C is bent from the extending portion 22A3 at the outer side inner wall portion 22A (the vehicle outer side end portion of the inner wall portion 26) toward the vehicle transverse direction outer side and the vehicle outer side (the vehicle upper side). Further, the vehicle transverse direction outer side end portion of the outer side connecting wall portion 22C is joined to the vehicle transverse direction inner side end portion of the outer side outer wall portion 22B. Due thereto, the outer side connecting wall portion 22C extends so as to be inclined toward the vehicle outer side (the vehicle upper side) while heading toward the vehicle transverse direction outer side. Further, in a cross-section cut in the vehicle transverse direction, the outer side connecting wall portion 22C is curved such that the vehicle transverse direction intermediate portion of the outer side connecting wall portion 22C becomes convex toward the exterior of the closed cross-sectional portion 30 (in detail, obliquely toward the upper side and the vehicle transverse direction inner side). Further, the vehicle transverse direction intermediate portion of the outer side connecting wall portion 22C is made to be a curved portion 22C1, and the portion that is disposed adjacent to the curved portion 22C1 at the vehicle transverse direction inner side thereof is made to be an inner side connecting portion 22C2, and the portion that is disposed adjacent to the curved portion 22C1 at the vehicle transverse direction outer side thereof is made to be an outer side connecting portion 22C3.

The curved portion 22C1 is formed in a circular arc shape (refer to the one-dot chain line shown in FIG. 1), and a central point CP of the curved portion 22C1 is set so as to coincide with the torsional center of the skeleton side portion 14A. Note that the torsional center of the skeleton side portion 14A is the center of torsion at the time when the lower end portion of the skeleton side portion 14A is fixed and the upper end portion of the skeleton side portion 14A twists, and is computed geometrically in accordance with the shape of the closed cross-sectional portion 30. Further, the inner side connecting portion 22C2 extends rectilinearly toward the vehicle transverse direction inner side and the vehicle lower side from the curved portion 22C1 so as to adjoin the curved portion 22C1, and the vehicle transverse direction inner side end of the inner side connecting portion 22C2 is joined to the vehicle outer side end of the outer side inner wall portion 22A. On the other hand, the outer side connecting portion 22C3 extends rectilinearly toward the vehicle transverse direction outer side and the vehicle upper side from the curved portion 22C1 so as to adjoin the curved portion 22C1, and the vehicle transverse direction outer side end of the outer side connecting portion 22C3 is joined to the vehicle transverse direction inner side end of the outer side outer wall portion 22B. Further, the angle of inclination of the outer side connecting portion 22C3 with respect to the vehicle transverse direction is set so as to be small as compared with the angle of inclination of the inner side connecting portion 22C2 with respect to the vehicle transverse direction.

The skeleton side portion 14A of the skeleton portion 14 has been described above, and the skeleton upper portion 14B of the skeleton portion 14 also is structured substantially similarly to the skeleton side portion 14A.

Operation and effects of the present embodiment are described next.

At the back door 10 that is structured as described above, the frame portion of the opening portion 12 that is for viewing toward the rear of the vehicle is structured by the skeleton portion 14, and the skeleton portion 14 is formed as a closed cross-sectional structure by the door inner panel 20 and the door outer panel 22. Further, the skeleton side portions 14A, that structure the vehicle transverse direction side portions of the skeleton portion 14, each have the inner wall portion 26 that structures the inner peripheral surface of the opening portion 12, and the inner wall portion 26 is disposed such that the vehicle transverse direction is the plate thickness direction thereof. Further, the skeleton side portion 14A has the outer side outer wall portion 22B that is disposed so as to face the rear window glass 16.

The outer side connecting wall portion 22C, that is bent toward the vehicle transverse direction outer side and the vehicle outer side from the vehicle outer side end portion of the inner wall portion 26 (i.e., from the extending portion 22A3 of the outer side inner wall portion 22A), is joined to the vehicle transverse direction inner side end portion of the outer side outer wall portion 22B. Due thereto, the field of vision toward the rear of the vehicle can be widened at the opening portion 12, as compared with a case in which the outer side connecting wall portion 22C is omitted from the door outer panel 22 (i.e., a case in which the extending portion 22A3 of the outer side inner wall portion 22A extends toward the vehicle outer side (the vehicle upper side) toward the rear window glass 16, and the outer side outer wall portion 22B extends toward the vehicle transverse direction inner side parallel to the rear window glass 16, and the extending portion 22A3 and the outer side outer wall portion 22B are joined).

Here, when viewing the skeleton side portion 14A in a cross-section cut in the vehicle transverse direction, the outer side connecting wall portion 22C is curved such that the vehicle transverse direction intermediate portion of the outer side connecting wall portion 22C is convex toward the exterior of the closed cross-sectional portion 30. Therefore, the shape of the closed cross-sectional portion 30 can be formed so as to be close to circular, as compared with a comparative example in which the outer side connecting wall portion 22C were to extend rectilinearly (concretely, a case in which the inner side connecting portion 22C2 of the outer side connecting wall portion 22C were to extend toward the rear window glass 16 side, refer to the outer side connecting wall portion 22C that is shown by the two-dot chain line in FIG. 1). Due thereto, the skeleton side portion 14A can be made to be a cross-sectional shape that is efficient with respect to torsional rigidity.

Namely, in the case of the above-described comparative example, the shape of the closed cross-sectional portion 30 is formed to be substantially rectangular. Further, the vicinity (refer to portion A shown in FIG. 1) of the joined portion of the vehicle transverse direction outer side portion of the outer side connecting wall portion 22C and the vehicle transverse direction inner side portion of the outer side outer wall portion 22B is a portion that hardly contributes at all to the torsional rigidity of the skeleton side portion 14A. In contrast, in the present embodiment, the outer side connecting wall portion 22C is curved such that the vehicle transverse direction intermediate portion of the outer side connecting wall portion 22C is convex toward the exterior of the closed cross-sectional portion 30, and therefore, the shape of the skeleton portion 14 can be formed so as to be close to circular. Namely, at the skeleton portion 14 of the present embodiment, the portion that does not contribute to the torsional rigidity of the skeleton side portion 14A can be made to be small, as compared with the above-described comparative example. As a result, the skeleton side portion 14A (the skeleton portion 14) can be made to be a cross-sectional shape that is efficient with respect tot torsional rigidity.

Further, because the outer side connecting wall portion 22C is curved such that the vehicle transverse direction intermediate portion of the outer side connecting wall portion 22C is convex toward the exterior of the closed cross-sectional portion 30, the angle of inclination of the outer side connecting portion 22C3 with respect to the vehicle transverse direction can be set to be small as compared with the angle of inclination of the inner side connecting portion 22C2 with respect to the vehicle transverse direction. Namely, as compared with the above-described comparative example, the vehicle transverse direction inner side end portion of the outer side outer wall portion 22B can be disposed at the vehicle transverse direction outer side. As a result, the opening surface area at the rear window glass 16 side of the opening portion 12 becomes larger, and therefore, the field of vision toward the rear of the vehicle of the back door 10 can be made even wider. Due to the above, the visibility toward the rear of the vehicle at the back door 10 can be improved, while the skeleton side portion 14A (the skeleton portion 14) is made to be a cross-sectional shape that is efficient with respect to torsional rigidity.

Further, as compared with the above-described comparative example, the vehicle transverse direction inner side end portion of the outer side outer wall portion 22B is disposed at the vehicle transverse direction outer side. Therefore, the surface area of the portion that is painted at the rear window glass 16 can be made to be small. Due thereto, the design of the back door 10 can be improved.

Moreover, in a cross-section that is cut in the vehicle transverse direction, the curved portion 22C1, that structures the vehicle transverse direction intermediate portion of the outer side connecting wall portion 22C, is formed in a circular arc shape whose center is the torsional center of the skeleton side portion 14A. Therefore, the skeleton side portion 14A (the skeleton portion 14) can be made to be a cross-sectional shape that is more efficient with respect to torsional rigidity.

Further, the inner wall portion 26 of the skeleton side portion 14A is structured to include the first joined portion 24. Namely, the inner wall portion 26 is structured as a wall portion that demarcates the interior and the exterior of the skeleton side portion 14A. Due thereto, because the first joined portion 24 is not made to extend-out from the skeleton side portion 14A to the exterior of the closed cross-sectional portion 30, the door inner panel 20 and the door outer panel 22 can be joined at the first joined portion 24 without impeding the visibility toward the rear of the vehicle at the back door 10.

Moreover, the outer side connecting wall portion 22C is connected to the outer side joined portion 22A1 via the extending portion 22A3, and the length of the extending portion 22A3 in the vehicle vertical direction is set to be relatively short. Namely, the vehicle transverse direction inner side end portion of the outer side connecting wall portion 22C is disposed so as to be adjacent to the upper end portion of the first joined portion 24. Due thereto, the surface area of the closed cross-sectional portion 30 becoming greater than needed can be suppressed. Accordingly, the visibility toward the rear of the vehicle at the back door 10 can be improved in respect to this point as well.

Figure 3A:
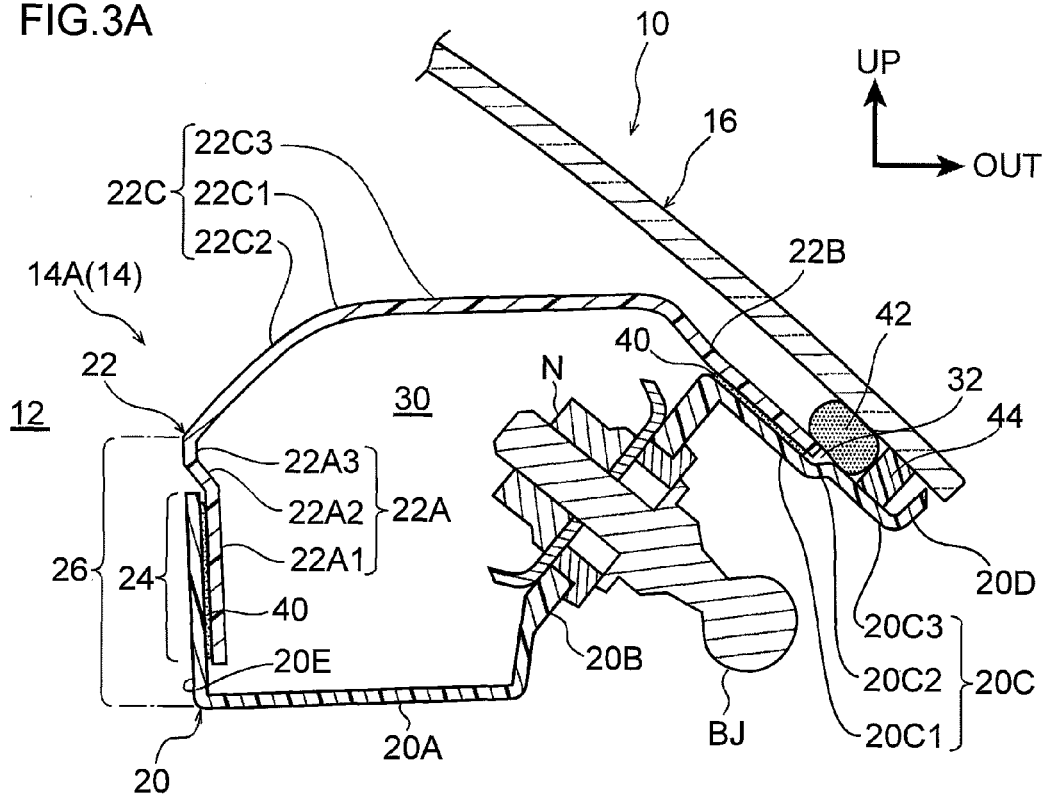
FIG. 3A is a cross-sectional view showing a modified example of the shape of an outer side connecting wall portion at the skeleton side portion shown in FIG. 1.

Note that, in the present embodiment, the outer side connecting portion 22C3 of the outer side connecting wall portion 22C extends-out obliquely toward the upper side and the vehicle transverse direction outer side from the curved portion 22C1. However, the angle of inclination of the outer side connecting portion 22C3 with respect to the vehicle transverse direction can be set arbitrarily. For example, as shown in FIG. 3A, the outer side connecting portion 22C3 may be set so as to extend toward the vehicle transverse direction outer side from the curved portion 22C1. In other words, the outer side connecting portion 22C3 may be set so as to extend parallel to the vehicle transverse direction. Due thereto, the visibility toward the rear of the vehicle at the back door 10 can be improved more.

Figure 3B:
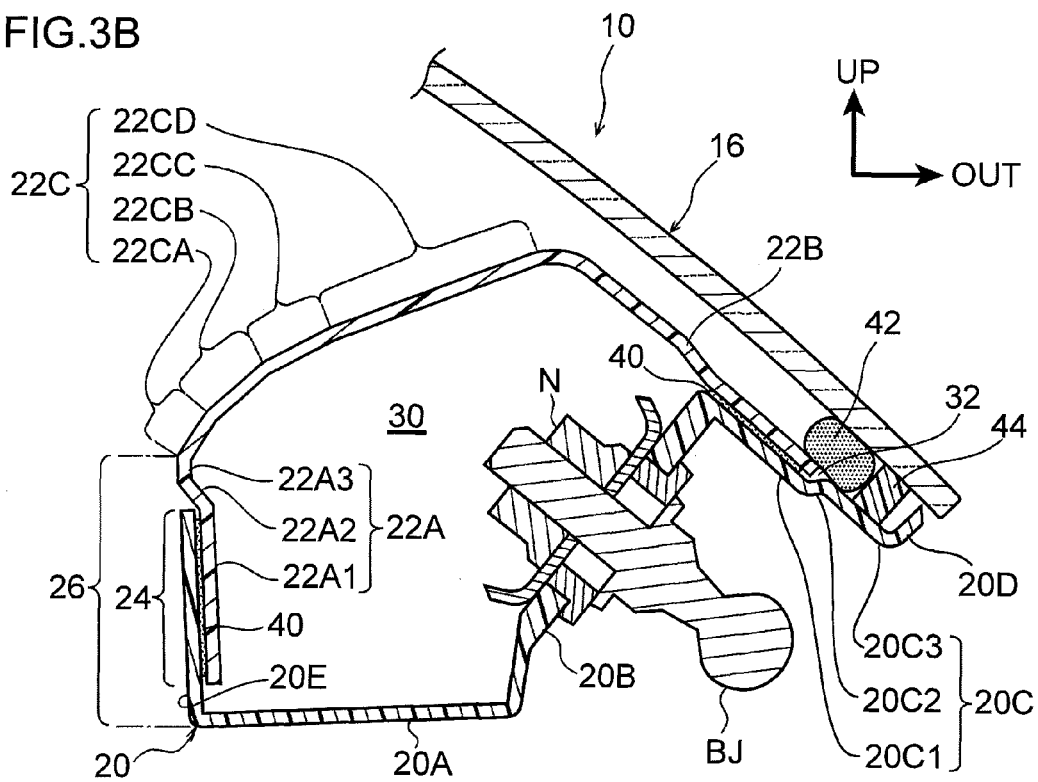
FIG. 3B is a cross-sectional view showing another modified example of the shape of the outer side connecting wall portion at the skeleton side portion shown in FIG. 1.

Further, in the present embodiment, the curved portion 22C1 is formed at the vehicle transverse direction intermediate portion of the outer side connecting wall portion 22C. However, the curved portion 22C1 may be omitted from the outer side connecting wall portion 22C. Namely, there may be a structure in which the inner side connecting portion 22C2 and the outer side connecting portion 22C3 are directly connected. In other words, the outer side connecting wall portion 22C may be structured by wall portions at two places that are formed in rectilinear shapes. Further, as shown in FIG. 3B, the outer side connecting wall portion 22C may be structured by wall portions at three or more places that are formed in rectilinear shapes (in the example shown in FIG. 3B, wall portions 22CA, 22CB, 22CC, 22CD that are at four places). Namely, "the intermediate wall portion is curved such that a vehicle transverse direction intermediate portion is convex toward an exterior of the closed cross-sectional portion" of the present invention also includes cases in which the outer side connecting wall portion 22C is structured by plural, rectilinear wall portions.

Further, in the example shown in FIG. 3B, the skeleton side portion 14A is formed in the shape of a polygon having plural vertices (boundary portions of the respective wall portions). Further, the angles of inclination of the wall portions 22CA, 22CB, 22CC, 22CD at the four places, with respect to the vehicle transverse direction, are set so as to become smaller toward the vehicle transverse direction outer side. Therefore, the cross-sectional shape of the skeleton side portion 14A is nearer to circular, and thus, the skeleton side portion 14A (the skeleton portion 14) can be made to be a cross-sectional shape that is more efficient with respect to torsional rigidity.

Further, in the present embodiment, the outer side connecting wall portion 22C is structured to include the inner side connecting portion 22C2 and the outer side connecting portion 22C3 that are formed in rectilinear shapes, and the curved portion 22C1 that is formed in a circular arc shape. However, the outer side connecting wall portion 22C may be structured by a single wall portion that is formed in the shape of an arc. For example, the outer side connecting wall portion 22C may be structured by a wall portion that is formed in the shape of an arc whose curvature changes, or the outer side connecting wall portion 22C may be structured by a wall portion that is formed in the shape of an arc having a constant curvature.

What is claimed is:

1. A vehicle comprising a resin back door mounted to the vehicle, the resin back door comprising:
   a skeleton portion that forms a frame portion framing an opening for viewing toward a rear of the vehicle, and that is formed by an inner panel and an outer panel, the inner panel and the outer panel being connected together so as to be closed in cross-section, the inner panel and the outer panel being made of resin; and
   a glass plate that is supported by the skeleton portion and closes the opening,
   wherein the frame portion includes side portions that are spaced apart from each other in a vehicle transverse direction, each of the side portions including:
   an inner wall portion that is disposed such that a thickness of the inner wall portion extends in the vehicle transverse direction, and that defines in the vehicle transverse direction an innermost peripheral surface of the side portion relative to a center line of the resin back door, wherein the innermost peripheral surface is a surface of the inner panel farthest from the glass plate and is further away from the glass plate than the outer panel;
   an outer wall portion that is disposed between the inner wall portion and the glass plate, and that faces the glass plate so that the outer wall portion extends substantially parallel with the glass plate; and
   an intermediate wall portion that is disposed between the inner wall portion and the outer wall portion, one end of the intermediate wall portion being connected to an end portion of the inner wall portion such that the intermediate wall portion extends from the end portion of the inner wall portion toward the glass plate and generally perpendicular to the glass plate, and another end of the intermediate wall portion being connected to an inner side end portion of the outer wall portion, the intermediate wall portion including a curved portion in cross-section being curved to form a convex shape protruding in a direction away from the side portion,
   in cross-section, the intermediate wall portion further including an inner side end portion that extends rectilinearly away from the curved portion toward the inner wall portion and away from the glass plate so as to adjoin the inner wall portion, and an outer side end portion that extends rectilinearly away from the curved portion toward the glass plate and toward the outer wall portion at an angle with respect to the outer wall portion, which extends substantially parallel to the glass plate, so as to adjoin the outer wall portion, and
   the outer panel including the outer wall portion, the intermediate wall portion, and a portion of the inner wall portion.

2. The vehicle of claim 1, wherein,
   in cross-section, each of the curved portions has a circular arc shape whose center is a torsional center of a respective one of the side portions.

3. The vehicle of claim 1, wherein,
   in cross-section, each of the intermediate wall portions has a polygonal shape.

4. The vehicle of claim 1, wherein
   each of the inner wall portions forms a portion of a connection of the inner panel to the outer panel.

5. The vehicle of claim 4, wherein,
   the inner side end portion of each of the intermediate wall portions is disposed adjacent to the connection.

* * * * *